(12) United States Patent
Hon et al.

(10) Patent No.: US 8,639,388 B2
(45) Date of Patent: Jan. 28, 2014

(54) TIME DOMAIN VIBRATION REDUCTION AND CONTROL

(75) Inventors: Robert C. Hon, Playa del Rey, CA (US); John F. Silny, Playa del Rey, CA (US)

(73) Assignee: Raytheon Company, Waltham, MA (US)

( * ) Notice: Subject to any disclaimer, the term of this patent is extended or adjusted under 35 U.S.C. 154(b) by 913 days.

(21) Appl. No.: 12/787,153

(22) Filed: May 25, 2010

(65) Prior Publication Data

US 2011/0295431 A1 Dec. 1, 2011

(51) Int. Cl.
*G06F 19/00* (2011.01)
(52) U.S. Cl.
USPC ............................... 700/280; 702/191; 62/6
(58) Field of Classification Search
USPC ............... 700/280, 275, 45; 702/191; 60/520; 62/6
See application file for complete search history.

(56) References Cited

U.S. PATENT DOCUMENTS

| | | | | |
|---|---|---|---|---|
| 4,453,751 A * | 6/1984 | Hamilton | | 292/340 |
| 5,012,428 A * | 4/1991 | Ueno et al. | | 700/280 |
| 5,392,607 A | 2/1995 | Wu | | |
| 5,836,165 A * | 11/1998 | Champion et al. | | 62/6 |
| 6,167,707 B1 * | 1/2001 | Price et al. | | 62/6 |
| 6,208,109 B1 * | 3/2001 | Yamai et al. | | 318/716 |
| 6,229,898 B1 * | 5/2001 | Goodman | | 381/71.4 |
| 6,330,800 B1 | 12/2001 | Price et al. | | |
| 7,062,922 B1 | 6/2006 | Kirkconnell et al. | | |
| 2005/0113979 A1 * | 5/2005 | Ichikawa | | 700/280 |
| 2006/0036351 A1 * | 2/2006 | Hopkins | | 700/280 |
| 2007/0056297 A1 * | 3/2007 | Price et al. | | 62/6 |

* cited by examiner

*Primary Examiner* — Kidest Bahta

(57) ABSTRACT

A vibration control system includes a mechanical system which generates vibration; a sensor configured to measure the vibration and generate a vibration signal thereof, and a processor configured: (a) receive a vibration signal from a sensor in a mechanical system; (b) model the vibration signal using a time-domain function; (c) adjust one of an amplitude coefficient and a phase coefficient of the modeled vibration signal; (d) output a control signal corresponding to the modeled vibration signal to the mechanical system so as to reduce the vibration; and (e) receive another vibration signal from the sensor. Steps (c)-(e) are repeated when the average value of the vibration signal is greater than a predetermined value. A method for vibration control is also disclosed.

24 Claims, 8 Drawing Sheets

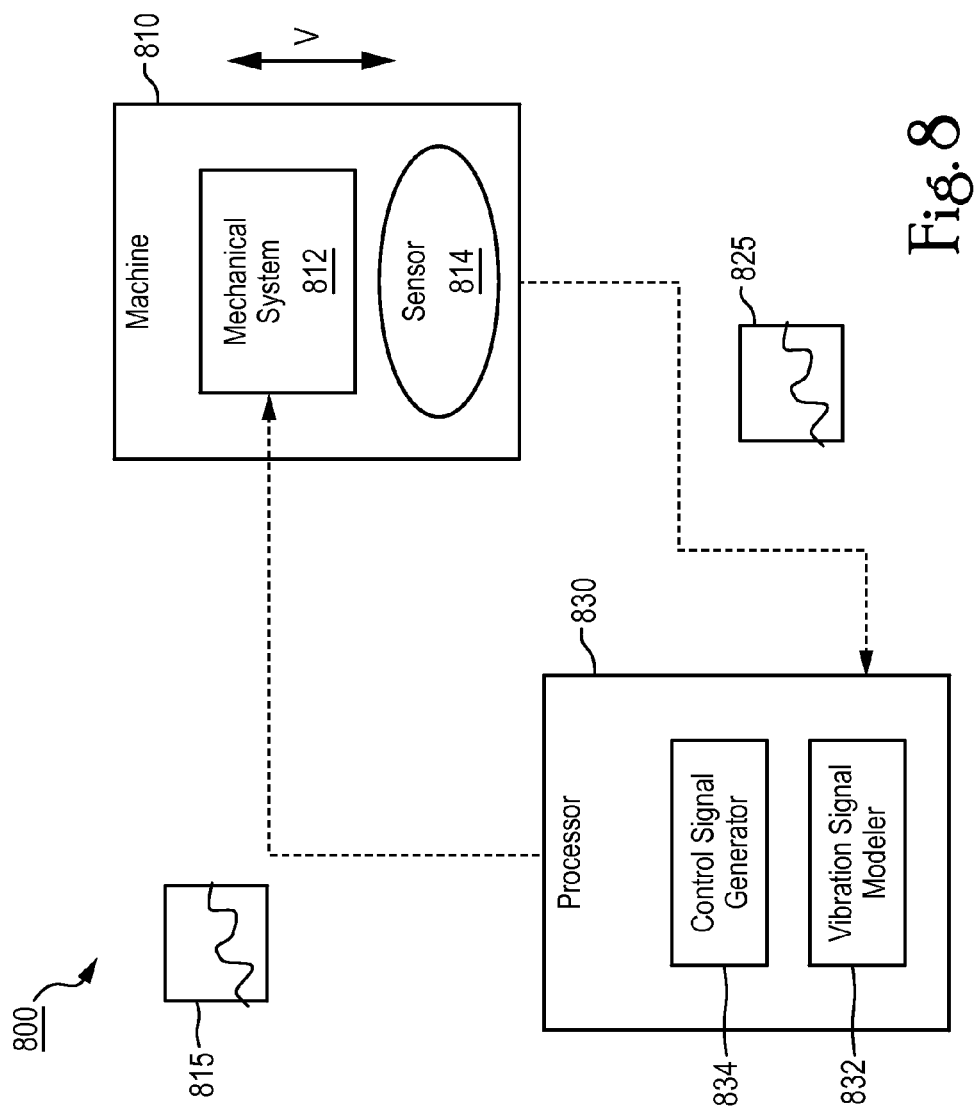

TIME DOMAIN VIBRATION REDUCTION AND CONTROL

BACKGROUND

This application generally relates to mechanical systems which generate vibrations, such as cryocoolers, and more particularly, to reducing and controlling vibrations thereof.

Linear cryocoolers generate significant force and disturbances during operation. This may even occur for those cryocoolers designed to be inherently balanced. The disturbances primarily result from slight imperfections in the internal moving mechanisms and asymmetries in internal gas flows therein. These can negatively impact the performance of systems into which the cryocooler is integrated. One such system, is a cooled infrared (IR) camera used in a thermal weapon sight or satellite-based missile detection system. Mechanical disturbances generated by the cryocooler during operation can cause high-frequency movement or "jitter" in the sensor's optical components and/or detector, leading to unacceptable levels of performance degradation.

The conventional method for handling vibrations is to employ an active vibration reduction system. Such systems utilize cryocooler-mounted sensors to sample the disturbance output of the cryocooler, after which the data is processed and used to generate a precisely-tuned signal that is fed back into the cryocooler drive waveform(s). This signal causes motor forces to be generated that (at least partially) counteract the originally-sample disturbance, resulting in lower overall disturbance output. Typically, these systems are iterative such that the cancellation signal is formed slowly (i.e., relative to the cryocooler operational frequency), with successive iterations resulting in progressively lower disturbance output.

Processing the disturbance in such a system involves performing frequency analysis on the data (for instance, fast Fourier transform (FFT)) or convolution-based analysis. In this way, the time-domain data is decomposed into a series of individual-frequency constituents, and this frequency-domain data is used to individually generate cancellation waveforms for each specific frequency of interest. For typical cryocoolers, the frequencies of interest are integer multiples of the operating frequency because this is where the majority of disturbances occur.

While these frequency-based analysis algorithms may be accurate, they require a significant amount of processing power in order to perform the algorithm processing at a reasonable rate. For very high-performance cryocooler systems, such as those used in space applications, this is often not an issue because system cost and complexity are typically considered secondary to achieving the highest performance possible. On the other hand, lower-cost cryocooler systems, such as those used in tactical applications, typically forgo active vibration reduction in order to minimize system cost and complexity.

As such, an improved vibration reduction methodology is desired which requires less processing power.

SUMMARY

In an embodiment, a vibration control system comprises: a processor configured to: (a) receive a vibration signal from a sensor in a mechanical system; (b) model the vibration signal using a time-domain function; (c) adjust one of an amplitude coefficient and a phase coefficient of the modeled vibration signal; (d) output a control signal corresponding to the modeled vibration signal to the mechanical system so as to reduce the vibration; and (e) receive another vibration signal from the sensor, wherein steps (c)-(e) are repeated when the average value of the vibration signal is greater than a predetermined value.

In another embodiment, a vibration control method comprises: (a) receiving a vibration signal from a sensor in a mechanical system; (b) modeling the vibration signal using a time-domain function; (c) adjusting one of an amplitude coefficient and a phase coefficient of the modeled vibration signal; (d) outputting a control signal corresponding to the modeled vibration signal to the mechanical system so as to reduce the vibration; and (e) receiving another vibration signal from the sensor, wherein steps (c)-(e) are repeated when the average value of the vibration signal is greater than a predetermined value.

In yet another embodiment, a vibration control system comprises: a mechanical system which generates vibration; a sensor configured to measure the vibration and generate a vibration signal thereof, and a processor configured to: (a) receive a vibration signal from a sensor in a mechanical system; (b) model the vibration signal using a time-domain function; (c) adjust one of an amplitude coefficient and a phase coefficient of the modeled vibration signal; (d) output a control signal corresponding to the modeled vibration signal to the mechanical system so as to reduce the vibration; and (e) receive another vibration signal from the sensor, wherein steps (c)-(e) are repeated when the average value of the vibration signal is greater than a predetermined value.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features shown or described in any one embodiment herein can be used in other embodiments as well.

BRIEF DESCRIPTION OF THE DRAWINGS

FIG. 8 shows an exemplary vibration control system for a machine in accordance with an embodiment.

DETAILED DESCRIPTION

An active vibration reduction methodology is described that may eliminate the need for frequency-based analysis of vibration disturbance data. The methodology uses a time-domain vibration control algorithm to reduce vibration for a mechanical system or machine. In one or more implementations, the algorithm may use a root means square (RMS) or a root sum square (RSS) averaging technique. Alternatively, a mean absolute error metric (i.e. the average of the absolute value of the errors). In fact, a wide variety of metrics may be used.

Figure 1:
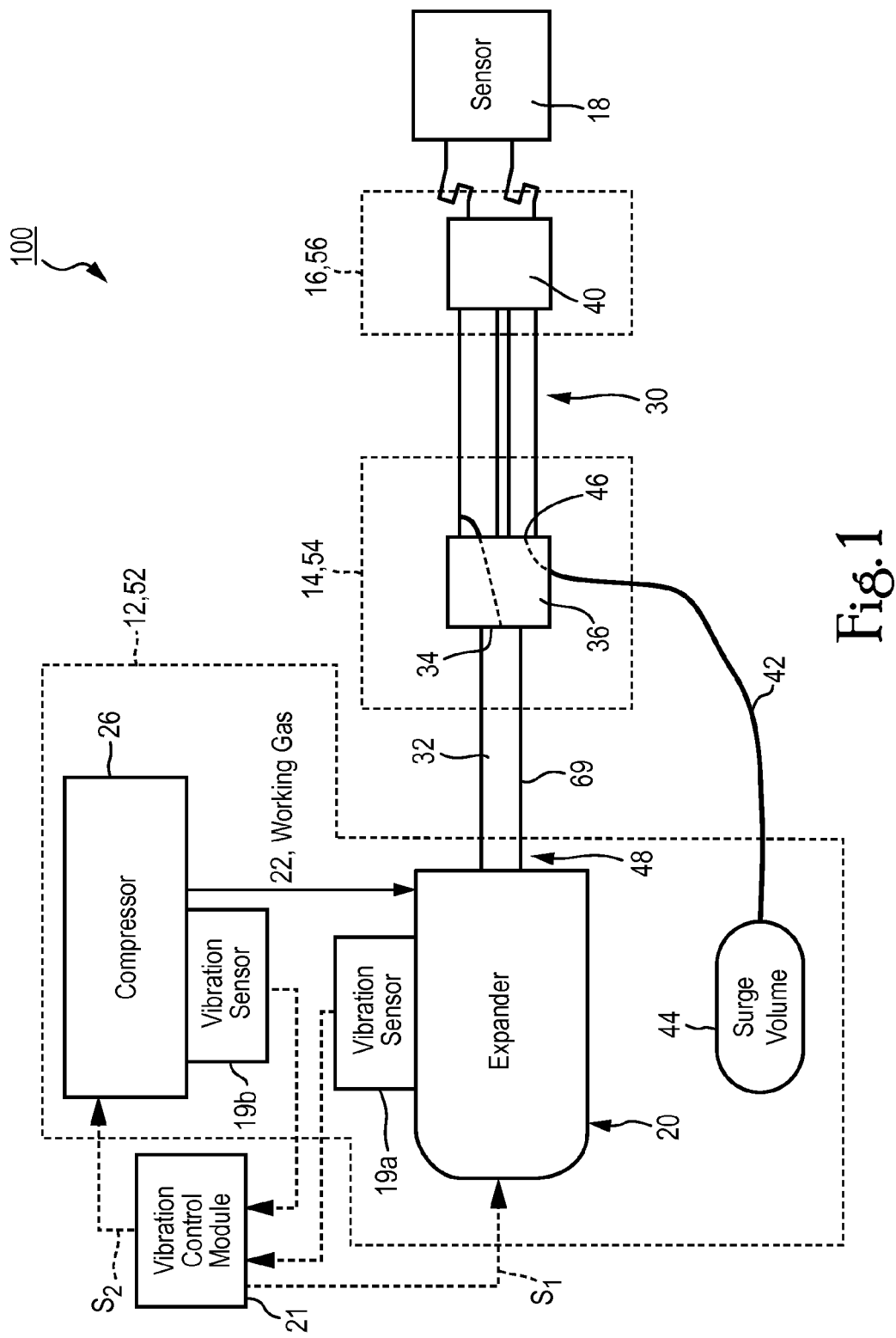
FIG. 1 schematically illustrates an exemplary two-stage cryocooler in accordance with an embodiment.

FIG. 1 schematically illustrates exemplary two-stage cryocooler 100 in accordance with an embodiment. Certain aspects of cryocooler 100 may be similar to corresponding aspects described in U.S. Pat. Nos. 7,062,922; 6,167,707 and 6,330,800, the descriptions of which are incorporated herein by reference. Cryocooler 100 includes an ambient temperature portion 12, first-stage temperature portion 14, and second-stage temperature portion 16. The second-stage temperature portion is coupled to a component to be cooled, such as sensor 18, such as an IR sensor. The first-stage of cryocooler 100 includes Stirling expander 20 for providing cooling by expanding working gas 22 compressed by compressor 26. The second stage of cryocooler 100 is pulse tube expander 30.

One or more vibration sensors 19 may be configured to measure vibration(s) of cryocooler 100. Sensors 19 may include any sensor configured to measure vibrations, such as, for example, an accelerometer or force sensor. As shown, two vibration sensors 19a, 19b may be provided, with first vibration sensor 19a attached to expander module 20 and second vibration sensor 19b attached to compressor module 26. Although, it will be appreciated that vibration sensor(s) 19 can be positioned at any desired location in cryocooler 100. For instance, in some implementations, one vibration sensor 19 may be connected to sensor 18 (so as to detect vibrations at sensor 18).

The measured vibrations are transmitted from vibration sensor 19a, 19b to vibration control module 21 shown in FIG. 1. Vibration control module 21 may include a processor that is configured to generate one or more vibration control signals S which reduce, eliminate, and/or ameliorate the measured vibrations. Vibration control signal S may be transmitted from vibration control module 21 to control compressor 26 of cryocooler 100. As shown vibration control signals $S_1$, $S_2$ are output from vibration control module 21 to expander 20 and compressor 26, respectively, for reducing, eliminating, and/or ameliorating the vibrations measured vibrations by vibration sensors 19a, 19b.

If vibration control signals $S_1$, $S_2$ are opposite of the vibration signals of expander 20 and compressor 26, respectively, the vibrations should be effectively reduced, cancelled, and/or ameliorated.

In operation of the system, compressor 26 supplies compressed working gas 22 such as helium, to first-stage Stirling expander 20. The working gas is expanded into expansion volume 32. The working gas flows from expansion volume 32 through Stirling expander outlet 34, through first-stage interface 36, and into second-stage pulse tube expander 30. Second-stage thermal interface 40 is provided between second-stage pulse tube expander 30 and a heat load in the form of the component to be cooled, such as sensor 18.

Inertance tube 42 is coupled on one end to first-stage interface 36, and on another, opposite end to surge volume 44 that is a part of ambient temperature portion 12. First-stage interface 36 is in gaseous communication with second-stage outlet 46. Inertance tube 42 and surge volume 44 provide modulation in the operation of cryocooler 100. Inertance tube 42 and surge volume 44 combine to produce a phase shift in the operation of cryocooler 100, to reduce the phase angle between a pressure wave and the cold end flow rate in pulse tube expander 30. The characteristics of inertance tube 42, such as the diameter and length of inertance tube 42, may be selected so as to achieve a desired performance within the cryocooler. The desired performance may include a goal of minimizing the phase angle between the mass flow rate and the pressure wave at the cold end of pulse tube 30, with an ultimate objective of optimizing thermodynamic efficiency.

Ambient temperature portion 12 includes warm end 48 of Stirling expander 20, as well as compressor 26 and surge volume 44. The components of ambient temperature portion 12 may be coupled to ambient temperature structure 52. First-stage temperature portion 14 includes first-stage interface 36, which may be coupled to first-stage structure 54. Second-stage portion 16 includes second-stage thermal interface 40, which may be coupled to second-stage temperature structure 56. First-stage interface 36 may be supported in a cantilevered structure by the thin-walled tube of expansion volume 32.

In one alternative implementation, inertance tube 42 can be replaced, for example, by a phase shifter and a connecting flow line. The phase shifter may be any of a variety of suitable devices, such as an orifice, a porous plug, or an active device, to provide the desired phase shift between the mass flow rate and the pressure wave at the cold end of pulse tube 30.

Cryocooler 100 is illustrative and it should be appreciated that other cryocooler designs and configuration may be considered within the scope of this disclosure.

Figure 2:
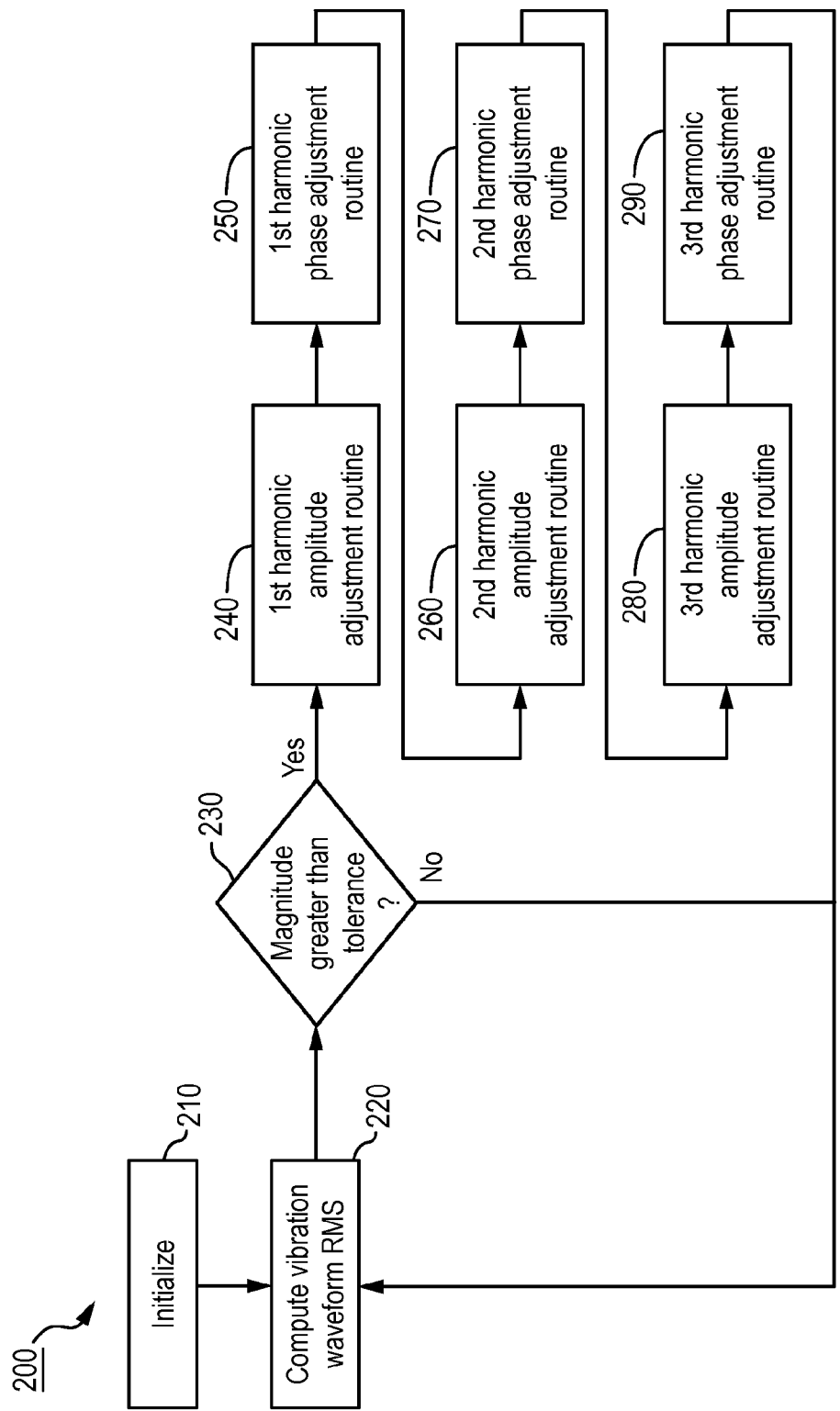
FIG. 2 shows a vibration control algorithm in accordance with an embodiment.

FIG. 2 shows vibration control algorithm 200 in accordance with an embodiment, and which may be implemented by vibration control module 21 shown in FIG. 1.

Vibration control algorithm 200 may receive as input a vibration signal, and outputs a vibration control reduction signal based to one or more mechanical systems based on algorithm 200. In one implementation, vibration control algorithm 200 may receive as input a vibration signal from vibration sensor 19 (FIG. 1), and outputs vibration control signals $S_1$, $S_2$ to and/or expander 20 and/or compressor 26 of cryocooler 100 using algorithm 200.

Algorithm 200 begins in step 210 by sampling the time-domain vibration output from a sensor configured to measure vibration of a mechanical system. For instance, the vibration signal may be an electrical signal output (e.g., in voltage units) from a vibration sensor. The sampling frequency of the sensor may be, for example, 2000 Hz, and over a time period, for example, of 0.50 seconds. Of course, a user may change the sampling frequency and/or sampling time period (if desired).

The sampled vibration signal from the vibration sensor may thus, include a plurality of data points $\{x_1, x_2, \ldots, x_N\}$, where N is the number of sensor readings for the sampled time period.

Typically, vibrations are periodic signals and may be characterized mathematically by modeling the sampled vibration signal in the time-domain (i.e., as a function of time). Any periodic waveform signal can be decomposed into a sum of sinusoidal functions at the fundamental frequency and its integer multiples (harmonics).

In one or more embodiments, the modeled vibration signal f(t) for the sampled vibration signal may be characterized as a sum of sinusoidal functions at the fundamental frequency and various harmonics thereof. For example, the modeled vibration signal f(t) may be characterized in the time domain using a plurality of sine wave functions according to equation 1, as follows:

$$f(t) = A_{DC} + \sum_{n=0}^{N} A_n \sin(\omega_n t + \theta_n) \quad (1)$$

where:

t is time, n is the nth harmonic of the fundamental frequency (n=0);

$A_n$ is a coefficient of amplitude for harmonic n of the fundamental frequency;

$A_{DC}$ is a DC offset (although typically not present);

$\omega_n$ is the frequency for the harmonic n; and $\Phi_n$ is a phase for the harmonic n.

Of course, the vibration signal could be characterized by other functions, such as, for example, cosine wave functions or other periodic waveform functions.

The fundamental frequency $\omega_1$ may be known a priori from the controller of the cryocooler which drives the mechanical system at a given frequency. And, the harmonic frequencies $\omega_n$ (for n≥1) may be multiples of the fundamental frequency $\omega_1$.

Next, in step 220, a vibration signal averaging technique may be computed over for the sampled time period. In one implementation (discussed below), the root-mean-square (RMS) value of the sampled vibration signal may be computed. Other averaging techniques might also be used, such as, for example, a root-sum-square (RSS) technique.

For instance, the RMS value $f_{rms}$ may be calculated for sampled vibration signal according to equation 2 as follows:

$$f_{rms} = \sqrt{\frac{x_1^2 + x_2^2 + \ldots + x_N^2}{N}} \quad (2)$$

In step 230, a determination is made if the RMS value $f_{rms}$ of the sampled vibration signal is greater than a predetermined threshold value or tolerance. For example, the tolerance may be 0.01 Vrms, but, the predetermined tolerance may be changed (as desired for particular performance). If the RMS value $f_{rms}$ of the sampled vibration signal is greater than the predetermined tolerance, algorithm 200 continues onto steps 240-290, in which an amplitude coefficient $A_n$, and/or a phase coefficient $\Phi_n$ correction adjustment may be made for each harmonic n of the modeled vibration signal f(t). Steps 240-290 each perform a time-domain adjustment, in which a harmonic coefficient for the amplitude $A_n$ and/or phase $\Phi_n$ of the modeled vibration signal f(t) is iteratively adjusted for each harmonic n, as further described below.

For ease of discussion, only the first (fundamental), second and third harmonic amplitude and phase coefficient correction adjustments are shown. However, it will be appreciated that other configurations are possible, both in the number of harmonics that may be corrected (e.g. first and third harmonics only, first through fifth harmonics, etc.), and in the adjustment order (e.g. phase then amplitude for alternating harmonics; harmonic amplitudes first followed by harmonic phases, etc.).

On the other hand, if it is determined that the RMS value $f_{rms}$ of the sampled vibration signal is less that the tolerance or threshold, algorithm 200 ends, and the modeled vibration signal f(t) having an adjusted amplitude coefficient is output as a control signal.

The control signal is intended to cancel out the vibration signal. For instance, the control signal may be the negative (or opposite value) of the vibration signal. It may be introduced to the controller (not shown) of a mechanical system. For example, in the case of cryocooler 100 shown in FIG. 1, the control signal may control expander 20 or compressor 26.

In some implementations, vibration control signal S may be a function of the modeled vibration signal f(t), as shown in equation (3):

$$S = -k \cdot f(t) \quad (3)$$

where:

k is a correction constant (or function).

For example, in one instance, k may be a unitary value of "1." Of course, k may be determined theoretical or experimentally to more accurately control a response of a controller of the mechanical system, in the case of feedback (or feed forward) of vibration control signal S. Of course, the above processing of vibration control signal S may be performed by the controller of the mechanical system, such as the cryocooler.

Figure 3:
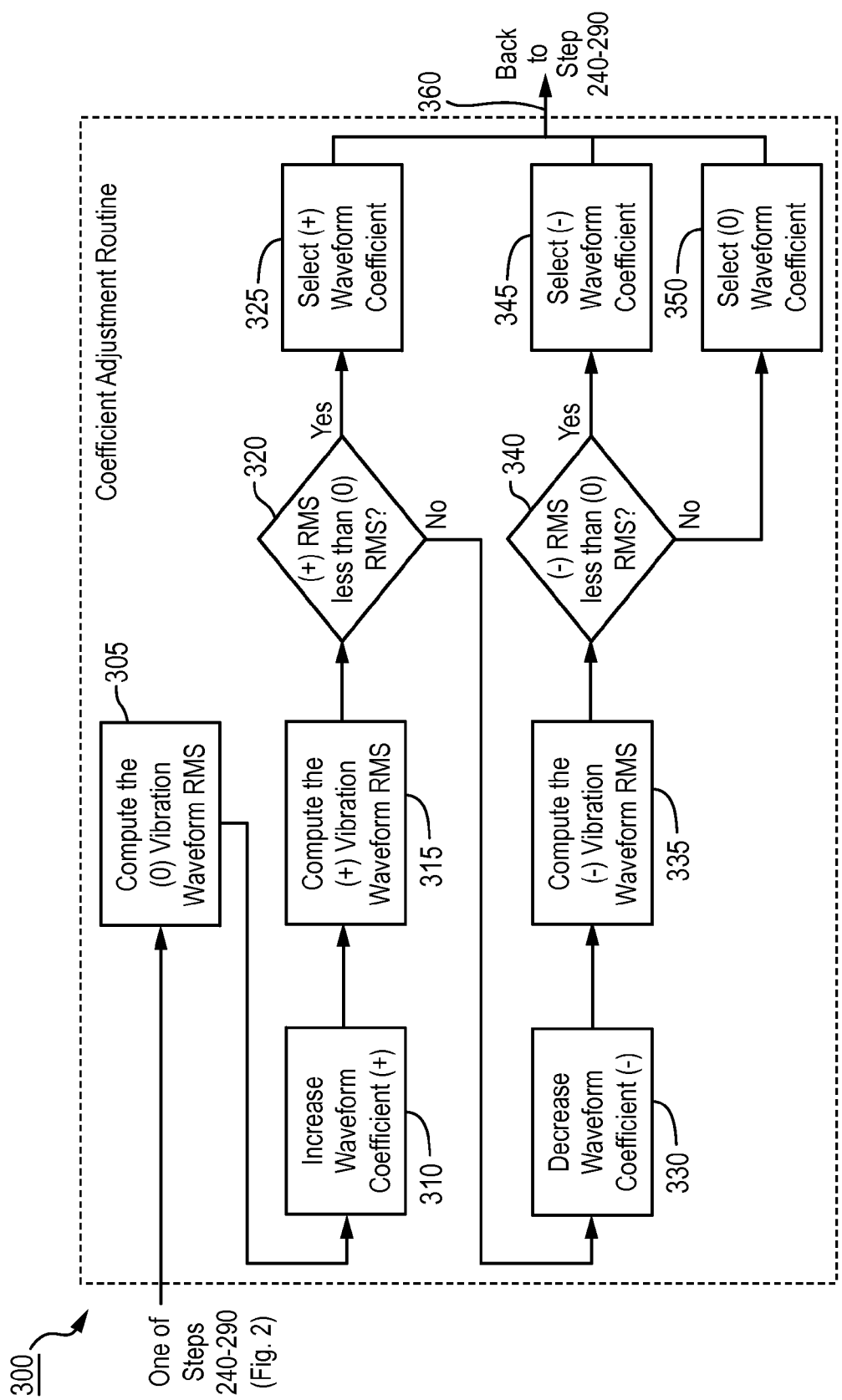
FIG. 3 shows a coefficient adjustment or optimization routine which may be used by the vibration control algorithm to adjust either the harmonic amplitude or phase of a vibration waveform component in accordance with an embodiment.
Figure 4A:
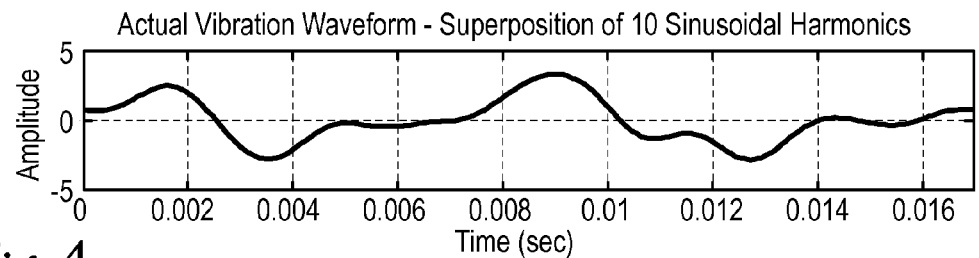
FIGS. 4(a)-4(e) show exemplary results of the application of an exemplary vibration reduction processing technique.
Figure 4B:
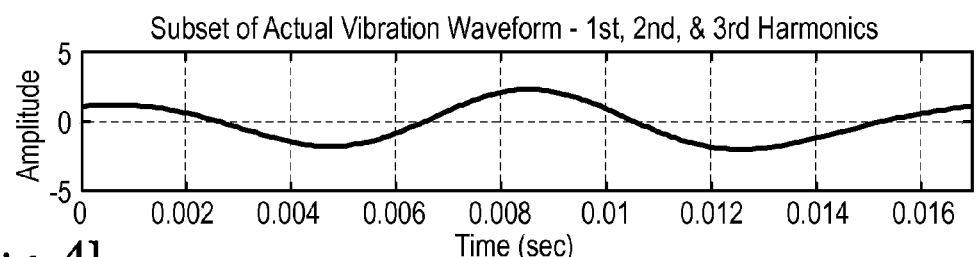
Figure 4C:
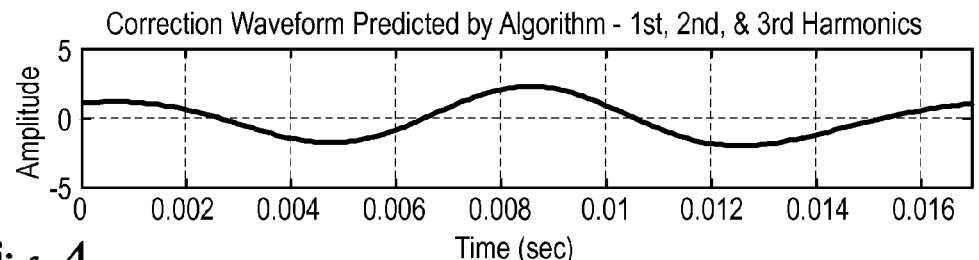
Figure 4D:
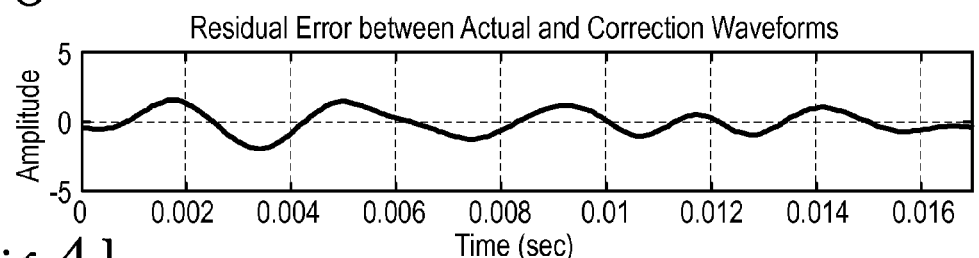
Figure 4E:
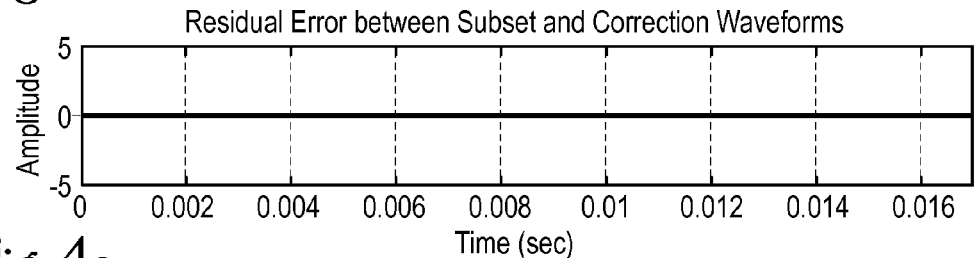

FIG. 3 shows exemplary coefficient adjustment or optimization routine 300 which may be used in one or more of steps 240-290 of algorithm 200 to adjust either the harmonic amplitude $A_n$ or phase $\Phi_n$ of the modeled vibration signal f(t) in accordance with an embodiment.

For illustrative purposes, routine 300 is described for an amplitude coefficient $A_n$. However, it will be appreciated that routine 300 may be similarly adapted for optimizing a phase coefficient $\Phi_n$ of the vibration waveform.

First, in step 305, the RMS value $f_{rms}$ of sampled vibration signal S is computed without any adjustments to the amplitude $A_n$ coefficient (or phase coefficient $\Phi_n$). This is noted in the figure as the "(0) RMS" value. In some instances, this step may be performed by a previous calculation thereof in an earlier step in algorithm 200.

Next, in step 310, the drive amplitude (or phase) at the harmonic frequency of interest n for the mechanical system is incremented in the positive direction. For a cryocooler, the mechanical system may be a compressor motor, for example.

Continuing to step 315, the vibration sensor of the mechanical system with the adjusted values (determined in step 310) is observed and sampled. The resulting RMS value of the sampled vibration signal for the adjusted values may be computed according to equation 2. This is noted in the figure as the "(+) RMS" value.

In step 320, a determination is made whether the (+) RMS value has decreased relative to the (0) RMS value. If so, routine 300 continues to step 325 where the increased amplitude coefficient (from step 310) is selected, and the adjustment routine terminates in step 360. This indicates a lower overall disturbance output.

Otherwise, if the (+) RMS value has increased relative to the (0) RMS value, then routine 300 proceeds to step 330, where the drive amplitude (or phase) of the mechanical system is decremented (decreased) in the negative direction. This is noted in the figure as the "(−) RMS" value.

Continuing to step 335, the vibration sensor of the mechanical system with the adjusted values (determined in step 330) is sampled and observed. The resulting RMS value of the sampled vibration signal for the adjusted values may be computed according to equation 2. This is noted in the figure as the "(−) RMS" value.

In step 340, a determination is made whether the (−) RMS value has decreased relative to the (0) RMS value. If the (−) RMS value is less than the original (0) RMS value, then the decreased amplitude coefficient $A_n$ (or phase coefficient $\Phi_n$), is selected in step 345, and then routine 300 terminates in step 360.

Otherwise, if the (−) RMS value has increased relative to the (0) RMS value, then routine 300 proceeds to step 350, where the original drive amplitude coefficient $A_n$ (or phase coefficient $\Phi_n$), is restored, and then routine 300 terminates in step 360.

At each iteration, the coefficient increments may be adjusted as desired. For example, an amplitude coefficient $A_n$ may be incremented or decremented by about 0.001 V each iteration. A phase coefficient $\Phi_n$ may be incremented or decremented by about 8E-4 radians each iteration. Other adjustments are also within the scope of this disclosure.

Thus, the coefficient increments may be independently adjusted (and/or optimized) for each harmonic amplitude coefficient $A_n$ and phase coefficient $\Phi_n$, respectively, in steps 240-290 (FIG. 2).

A single iteration of the vibration control algorithm 200 may be completed after the harmonic coefficients (e.g. an amplitude and/or phase for each harmonic frequency $\omega_n$) have been adjusted. Changes to the sampled vibration signal can further be made on a frequency-by-frequency basis. However, these changes may be made to the harmonics of the machine's drive frequency (even though the frequency content of the disturbance reduction waveform is known without any frequency-analysis). Each harmonic frequency $\omega_n$ of interest of the mechanical system may be considered by the cryocooler user or pre-set based on higher-level system requirements.

Without being bound by theory, algorithm 200 is believed to be possible by the fact that almost all disturbances emitted from most mechanical systems (e.g., cryocoolers) occur at multiples of the drive frequency. Frequency-analysis of the vibration signal is therefore not required. As will be appreciated, no frequency-domain processing has occurred during execution of routine 300. The disturbance feedback is processed in the time domain, the result of which is a simple RMS value that describes the overall level of disturbance of the vibration waveform.

Testing

I. Simulation

The inventors implemented a Matlab® simulation to test the performance of vibration control algorithm 200. A waveform, representing actual vibration, was initially generated using a superposition of 10 sinusoidal harmonics with random amplitude and phase coefficients. Random amplitudes and phases were generated in the ranges [0.1, 5.0] and [−π, π], respectively using the built-in uniform pseudo-random number generator in Matlab®. These randomly generated values of the actual vibration signal were recorded for later reference.

The vibration correction algorithm was then implemented to correct the 1st, 2nd, and 3rd order harmonics of the signal (although the actual vibration signal actually contained harmonics up to 10th order). A maximum of 1,000 Monte Carlo iterations were executed, with initial values of 0 for the amplitude and phase coefficients of the modeled vibration signal, respectively, and 0.005 increment step sizes for both amplitude and phase.

FIG. 4 details exemplary simulated results of the application of the vibration reduction processing. After about 355 iterations, the processing reached convergence, which near-perfectly compensates for the 1st, 2nd, and 3rd order harmonics of the actual vibration signal.

FIG. 4($a$) shows the exemplary vibration signal realized using a superposition of 10 sinusoids with randomly generated amplitude and phase coefficients. FIG. 4($b$) shows the 1st, 2nd, and 3rd harmonic components of the exemplary vibration signal. FIG. 4($c$) shows that final 1st, 2nd, and 3rd harmonic coefficients of the modeled vibration signal generated by the algorithm after 355 iterations. FIG. 4($d$) shows the difference between the total vibration signal (all 10 harmonics) and the modeled vibration signal (only 1st, 2nd, and 3rd harmonics) showing uncorrected higher order harmonics. The RMS error is approximately 0.8561 Vrms. FIG. 4($e$) shows the difference between the 1st, 2nd, and 3rd order harmonics of the actual vibration signal and the modeled vibration signal (only 1st, 2nd, and 3rd harmonics) showing near perfect compensation. The RMS error is approximately 0.0258 Vrms.

Figure 5A:
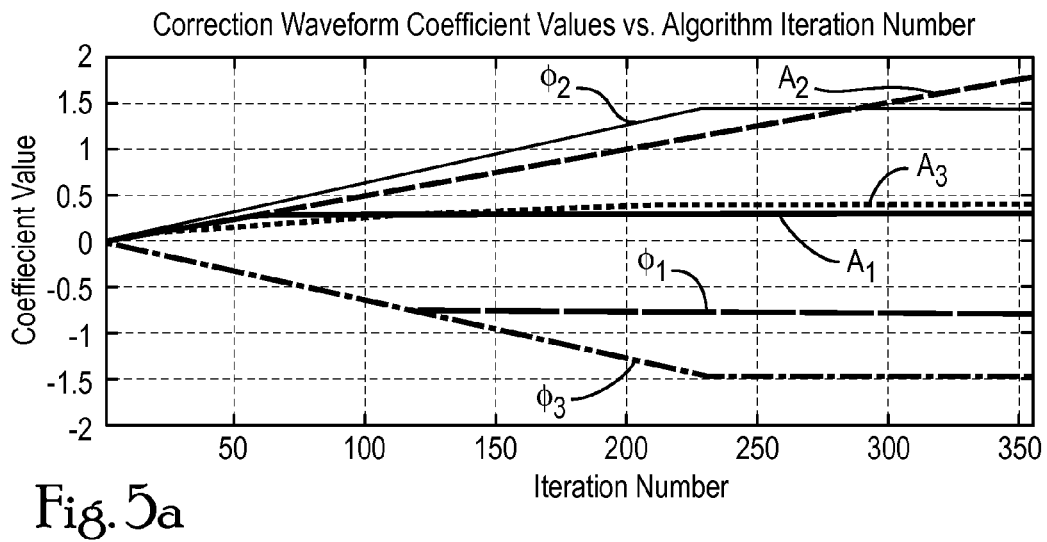
FIGS. 5(a)-5(c) show the convergence properties of an exemplary algorithm results in FIGS. 4(a)-4(e).
Figure 5B:
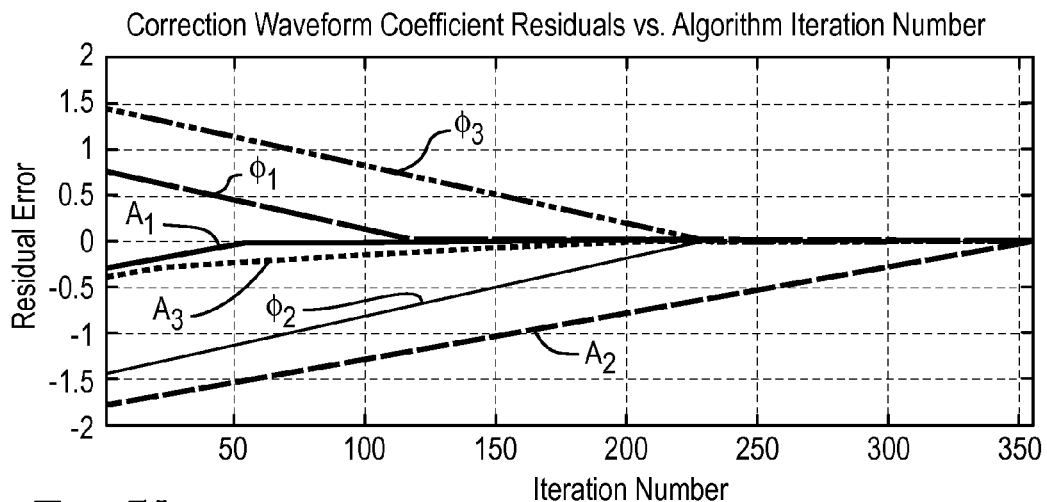
Figure 5C:
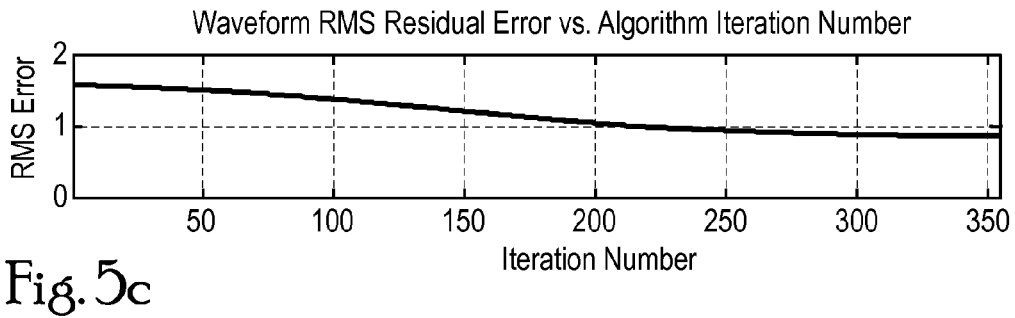

FIG. 5 shows the convergence properties of the algorithm for the simulated data of FIG. 4. Both the error in the harmonic coefficients (amplitude and phase) and the total RMS error show convergence.

FIG. 5($a$) shows coefficient values (amplitude and phase) of the modeled vibration signal consisting of 1st, 2nd, and 3rd order harmonics plotted vs. algorithm iteration and showing steady state convergence after 355 iterations. FIG. 5($b$) shows that the difference between each coefficient and the actual vibration signal coefficient plotted vs. iteration showing convergence to near 0 error for each coefficient. FIG. 5($c$) shows that RMS error between actual vibration signal and modeled vibration signal vs. algorithm iteration showing both reduction and steady state.

Table 1, below, summarizes the actual and predicted coefficients values for this test case, which shows excellent correction of 1st, 2nd, and 3rd order harmonics.

TABLE 1

Tests results.

| Harmonic | Actual Amplitude (Vrms) | Predicted Amplitude (Vrms) | Amplitude Error (Vrms) | Actual Phase (rad) | Predicted Phase (rad) | Phase Error (rad) |
|---|---|---|---|---|---|---|
| 1 | 0.309033 | 0.310 | 0.000967 | −0.765379 | −0.775 | −0.009621 |
| 2 | 1.775632 | 1.740 | −0.035632 | 1.442073 | 1.440 | −0.002073 |
| 3 | 0.399653 | 0.405 | 0.005347 | −1.451072 | −1.450 | 0.001072 |
| 4 | 0.849463 | — | −0.849463 | −0.141421 | — | 0.141421 |
| 5 | 0.631242 | — | −0.631242 | −1.655965 | — | 1.655965 |
| 6 | 0.161318 | — | −0.161318 | 2.071210 | — | −2.071210 |
| 7 | 0.551131 | — | −0.551131 | 2.729908 | — | −2.729908 |
| 8 | 0.078582 | — | −0.078582 | −1.996623 | — | 1.996623 |
| 9 | 0.065063 | — | −0.065063 | −0.064316 | — | 0.064316 |
| 10 | 0.104690 | — | −0.104690 | 2.487460 | — | −2.487460 |

Performance over multiple test cases was further simulated using a 1,000 trial Monte Carlo (MC) simulation. For each trial, an exported vibration waveform was generated with content up to the 10th harmonics using random amplitude and phase. The vibration correction methodology was implemented for each trial and the RMS error between the actual and modeled vibration signals containing the 1st, 2nd, and 3rd order harmonics was recorded.

Figure 6:
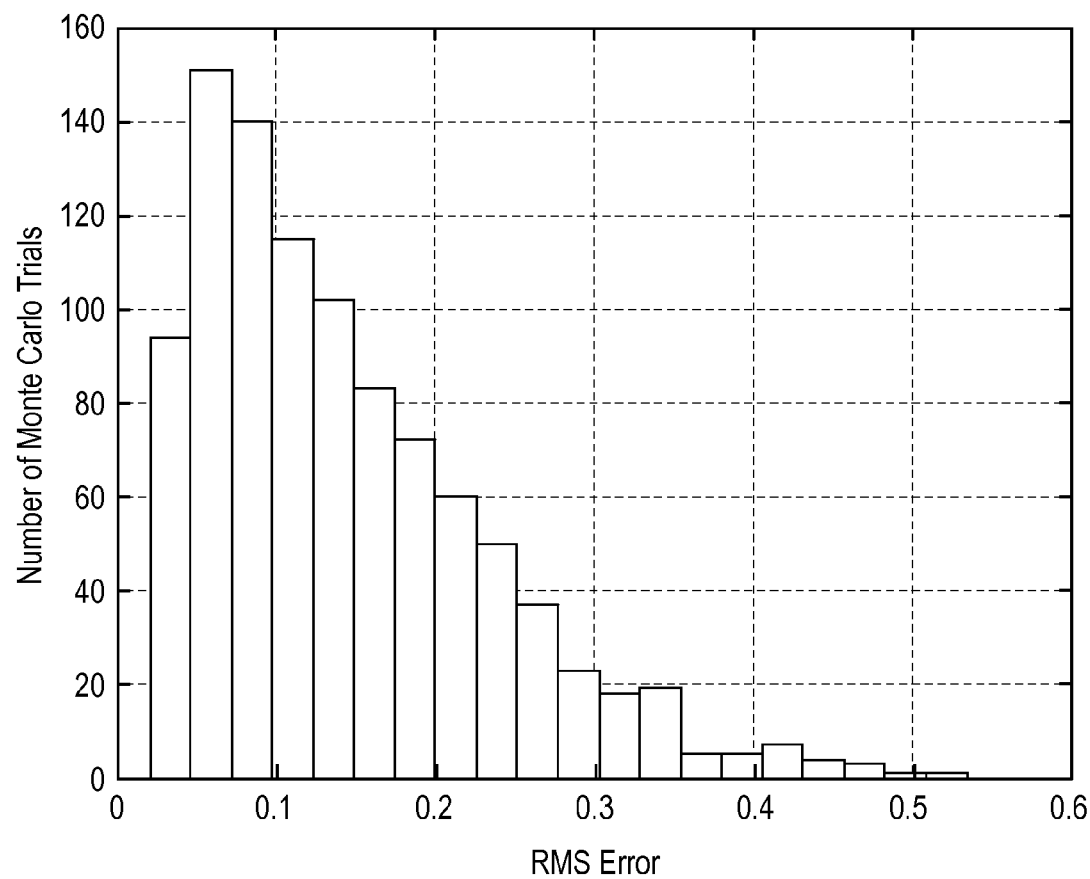
FIG. 6 shows a histogram of root means square (RMS) error for simulated test data.

FIG. 6 shows a histogram of the RMS error over all 1,000 MC trials. Although there is some variability final RMS error due to the stochastic nature of the simulation, the data converged in every trial and reduced the total vibration.

II. Laboratory Testing

Figure 7:
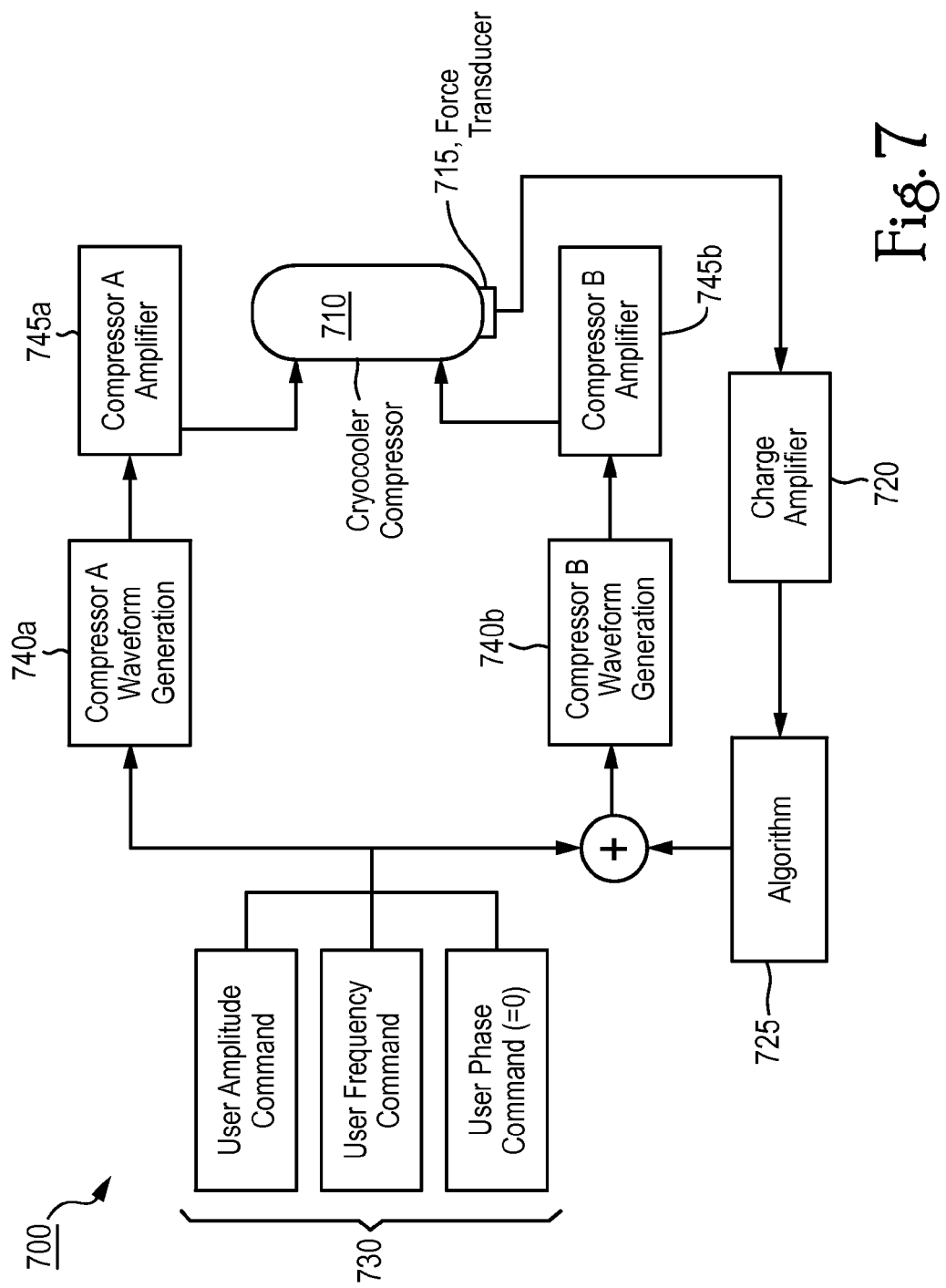
FIG. 7 shows a test setup used by the inventors for conducting testing.

The inventors conducted testing at the Raytheon Cryocooler Development Laboratory in El Segundo, Calif. FIG. 7 shows test setup 700 used by the inventors. Raytheon High Capacity RSP2 (HC-RSP2) cryocooler 710 was used because of its availability and inclusion of built-in disturbance force sensors. HC-RSP2 710 includes a Stirling first stage and a moving displacer piston in the expander module that is largely driven by pneumatic forces emanating from the compressor module. Movement of the displacer motor in the HC-RSP2 expander module causes disturbance forces that cannot be balanced by the compressor module, placing a lower bound on the disturbance level that could be achieved in this testing. In order to reduce this level, the displacer motor coil was shorted during testing such that self-induced coil currents would serve to reduce the amplitude of the displacer movement.

An engineering test rack was utilized to drive the HC-RSP2, and algorithm 725 (corresponding to algorithm 200) was implemented using a combination of LabView® and MATLAB® software applications. Vibration sensor 715, (e.g., one of three compressor-mounted piezoelectric force sensors) was used to provide an input signal to single channel laboratory charge amplifier 720, the output of which was digitized using a National Instruments Corp. "track and hold" data acquisition card. Each data sample was one-second long, containing many periods of disturbance data. The RMS value of the complete one-second sample was used as input for algorithm 725 such that noise was significantly reduced. A Butterworth alignment low-pass filter with a user-settable corner frequency was also implemented so that higher-frequency noise could be further reduced. User controls 730 were also included for assignment of the drive amplitude, frequency and phase. Vibration control algorithm 725 was turned on and off by a simple switch in the LabView® program. The rack servo controller for cryocooler 710 was bypassed for the test such that algorithm 725 directly determined the control signals 740a, 740b, respectively, to be input to amplifiers 745a, 745b of the cryocooler compressor motors.

During testing, the cryocooler compressor motors were first driven to a maximum stroke level at a frequency of 40 Hz. This value was limited by the stroke length of the cryocooler displacer motor, driven by pressure forces generated by the compressor module; an overly-high compressor stroke would drive the displacer to its hardstops, resulting in corrupted disturbance signals. The cycle time of vibration reduction algorithm 725 was limited to approximately 6 seconds to ensure that the cryocooler was reaching steady state after each step of the drive amplitude and/or phase. At maximum compressor stroke the vibration RMS value was typically in the range of 0.70-0.85 Vrms.

Upon activating vibration control algorithm 725, the vibration level was found to undergo a brief transient period during which the vibration level would sometimes rise by a small amount as processing of the algorithm made the first few steps for amplitude and phase. This was then followed by a longer period during which the vibration level would decrease monotonically to a level in the 0.05-0.10 Vrms range, representing a reduction of fundamental frequency vibration force by approximately 90%. Higher frequency vibration was unaffected to the 1st order. The lowest achievable vibration level was believed to be limited by the uncompensated oscillation of the displacer motor. A production setup, with no unbalanced displacer mechanism, would likely achieve significantly lower levels.

This testing was successful in that it significantly reduced the fundamental-frequency vibration in a linear oscillating cryocooler. This methodology would appear to perform equally well when operating at harmonics of the drive frequency of the cryocooler as well.

Algorithm 200 may be used for reducing vibrations in various machines and mechanical devices. And, test setup 700 might also be implemented as an embodiment.

FIG. 8 shows exemplary vibration control system 800 for a machine in accordance with an embodiment.

Machine 810 may include a mechanical system 812 which generates vibration V. Mechanical system 812 might be, for instance, a compressor, piston and cylinder assembly, motor, engine, rotary or linear device, or other system which generates periodic vibrations. Control signal 815 may be generated (or augmented) by processor 830 and is input to mechanical system 812, and control signal 815 may be used to control mechanical system 812. For instance, control signal 815 may direct mechanical system 812 to operate at a driving frequency. The feedback signal for these types of mechanical systems is usually force or acceleration (although velocity or displacement might also be used).

Sensor 814 may be configured to sense or measure vibration V of mechanical system 812. Sensor 814 may be a force, acceleration, velocity (speed) or displacement sensor, as known in the art. Various sensing technology for measuring vibration disturbances and/or motion may be employed, such as, for example, optical, electrical-mechanical laser, mechanical, etc. Whether directly or via processor 830, sensor 814 outputs measured vibration signal 825. For instance, as known in the art, velocity and acceleration may be converted to displacement by taking the a first and second integral thereof, respectively.

Vibration signal 825 is sampled and modeled for instance using equation 1. The resultant modeled vibration signal may be vibration displacement as a function of time. Vibration signal 825 can be characterized as a time-domain function having amplitude and phase components for various frequencies. This may correspond to the drive frequency (or one or more harmonics thereof) of mechanical system 812.

Vibration signal 825 is input to processor 830, which processes the vibration signal 825 and adjusts control signal 815 to the mechanical system 812. Processor 830 may be configured to implement algorithm 200.

Processor 830 may include vibration signal modeler 832, which is configured to execute algorithm 200, along with control signal generator 834, which is configured to generate control signal 815 based on the modeled vibration signal. Processor 830 may include dedicated hardware (such as, microprocessor, central processing unit (CPU), an application specific integrated circuit (ASIC) or field programmable gate array (FPGA)), software (or firmware), or a combination of dedicated hardware and software. Of course, it will be appreciated that any number of hardware and/or software implementations, programming languages, and operating platforms may be used. As such, the description or recitation of any specific hardware or software implementation, programming language, and operating platform herein is exemplary only and should not be viewed as limiting. For the different applications of the embodiments disclosed herein, the programming and/or configuration may vary.

As software, for instance, algorithm 200 may be stored on a computer- or machine-readable storage media having computer or machine-executable instructions executable by one or more processors. In one implementation, algorithm 200 may reside on a memory, such as, for example, any non-volatile electronic memory device (e.g., flash memory, EEPROM, etc.) or other memory device (e.g., disk drive, writable optical disk, etc.).

While processor 830 is illustrated outside of machine 810 in FIG. 8, it will be appreciated that in some instances, processor 830 may be integrated within machine 810.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A vibration control system comprising:
    a processor configured to:
        (a) receive a vibration signal from a sensor in a mechanical system;
        (b) model the vibration signal using a time-domain function;
        (c) adjust one of an amplitude coefficient and a phase coefficient of the modeled vibration signal;
        (d) output a control signal corresponding to the modeled vibration signal to the mechanical system so as to reduce the vibration; and
        (e) receive another vibration signal from the sensor,
        wherein steps (c)-(e) are repeated when an average value of the vibration signal is greater than a predetermined value.

2. The system according to claim 1, wherein, in step (c), the amplitude coefficient, the phase coefficient, or both, of the modeled vibration signal is incrementally increased or decreased each iteration in a manner to reduce the vibration signal.

3. The system according to claim 2, wherein the amplitude coefficient is increased or decreased by about 0.05V each iteration.

4. The system according to claim 2, wherein the phase coefficient is increased or decreased by about 8E-4 each iteration.

5. The system according to claim 1, wherein the amplitude coefficient, the phase coefficient, or both, is applied to one or more harmonics of the vibration signal.

6. The system according to claim 1, wherein the average value of the vibration signal is computed using a root mean square (RMS) or a root sum square (RSS) time-domain technique.

7. The system according to claim 1, further comprising:
    a sensor configured to measure the vibration and generate a vibration signal thereof.

8. The system according to claim 7, wherein the processor is configured to sample data from the sensor about every 6 seconds.

9. The system according to claim 1, wherein the control signal is a function of the modeled vibration signal.

10. A vibration control method comprising:
    (a) receiving a vibration signal from a sensor in a mechanical system;
    (b) modeling the vibration signal using a time-domain function;
    (c) adjusting one of an amplitude coefficient and a phase coefficient of the modeled vibration signal;
    (d) outputting a control signal corresponding to the modeled vibration signal to the mechanical system so as to reduce the vibration; and
    (e) receiving another vibration signal from the sensor,
    wherein steps (c)-(e) are repeated when an average value of the vibration signal is greater than a predetermined value.

11. The method according to claim 10, wherein, in step (c), the amplitude coefficient, the phase coefficient, or both, of the modeled vibration signal is incrementally increased or decreased each iteration in a manner to reduce the vibration signal.

12. The method according to claim 11, wherein the amplitude coefficient is increased or decreased by about 0.001 V each iteration.

13. The method according to claim 11, wherein the phase coefficient is increased or decreased by about 8E-4 radians each iteration.

14. The method according to claim 10, wherein the amplitude coefficient, the phase coefficient, or both, is applied to one or more harmonics of the modeled vibration signal.

15. The system according to claim 10, wherein the average value of the vibration signal is computed using a root mean square (RMS) or a root sum square (RSS) time-domain technique.

16. The method according to claim 10, wherein the mechanical system is one of: a compressor, a piston/cylinder assembly, a motor, an engine, a rotary or a linear device.

17. The method according to claim 10, wherein the processor is configured to sample data from the sensor about 2000 Hz.

18. The method according to claim 10, wherein the control signal is a function of the modeled vibration signal.

19. A vibration control system comprising:
    a mechanical system which generates vibration;
    a sensor configured to measure the vibration and generate a vibration signal thereof, and
    a processor configured to:
        (a) receive a vibration signal from the sensor in a mechanical system;
        (b) model the vibration signal using a time-domain function;
        (c) adjust one of an amplitude coefficient and a phase coefficient of the modeled vibration signal;
        (d) output a control signal corresponding to the modeled vibration signal to the mechanical system so as to reduce the vibration; and
        (e) receive another vibration signal from the sensor,
        wherein steps (c)-(e) are repeated when an average value of the vibration signal is greater than a predetermined value.

20. The system according to claim 19, wherein, in step (c), the amplitude coefficient, the phase coefficient, or both, of the modeled vibration signal is incrementally increased or decreased each iteration in a manner to reduce the vibration signal.

21. The system according to claim 19, wherein the machine is a cryocooler.

22. The system according to claim 19, wherein the mechanical system is one of: a compressor, a piston/cylinder assembly, a motor, an engine, a rotary or a linear device.

23. The system according to claim 19, wherein the control signal is a function of the modeled vibration signal.

24. The system according to claim 19, wherein the average value of the vibration signal is computed using a root mean square (RMS) or a root sum square (RSS) time-domain technique.

* * * * *